(12) United States Patent
Spiers et al.

(10) Patent No.: US 12,430,803 B2
(45) Date of Patent: Sep. 30, 2025

(54) METHOD FOR DETERMINING REPRESENTATIVE COLOURS FROM AT LEAST ONE DIGITAL COLOUR IMAGE

(71) Applicant: Akzo Nobel Coatings International B.V., Amsterdam (NL)

(72) Inventors: Peter Mark Spiers, Amsterdam (NL); Arjan Gijsenij, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 434 days.

(21) Appl. No.: 17/918,258

(22) PCT Filed: Apr. 13, 2021

(86) PCT No.: PCT/EP2021/059493
§ 371 (c)(1),
(2) Date: Oct. 11, 2022

(87) PCT Pub. No.: WO2021/209413
PCT Pub. Date: Oct. 21, 2021

(65) Prior Publication Data
US 2023/0136460 A1   May 4, 2023

(30) Foreign Application Priority Data
Apr. 16, 2020 (EP) .................................. 20169805

(51) Int. Cl.
*G06T 7/90* (2017.01)
*G06T 11/00* (2006.01)
(52) U.S. Cl.
CPC .............. *G06T 7/90* (2017.01); *G06T 11/001* (2013.01); *G06T 2207/10024* (2013.01)

(58) Field of Classification Search
CPC .............................. G06T 7/90; G06T 11/001; G06T 2207/10024
See application file for complete search history.

(56) References Cited

U.S. PATENT DOCUMENTS 9,177,391 B1 * 11/2015 Dorner .................. H04N 1/644
2003/0011612 A1    1/2003 Luo
(Continued)

FOREIGN PATENT DOCUMENTS

CN      106202352 A    12/2016
EP         1274228 A2    1/2003
(Continued)

OTHER PUBLICATIONS

Palette Based Image Recoloring, Zhang et al 2017 (Year: 2017).*
(Continued)

*Primary Examiner* — Jianxun Yang
(74) *Attorney, Agent, or Firm* — Pauly, DeVries Smith & Deffner LLC (57) ABSTRACT

A computer implemented method for determining a predetermined number, k, of representative colours from at least one digital colour image is disclosed. The method comprises the steps of: a) obtaining at least one digital colour image having a number, p, of pixels each pixel having a colour value within an n-dimensional colour space; b) defining a predetermined number, K, of cluster centres which are distributed in a predetermined pattern in the colour space, wherein K>k; c) forming clusters by associating for each pixel its colour value with the nearest of the cluster centres; d) reducing the number of clusters to k by deleting cluster centres and/or merging clusters; and e) defining a respective representative colour from each of the resulting k clusters.

10 Claims, 8 Drawing Sheets

(56) References Cited

U.S. PATENT DOCUMENTS

| | | | |
|---|---|---|---|
| 2012/0011612 A1 | 1/2012 | Skrsyniarz | |
| 2012/0092359 A1 | 4/2012 | O'Brien-Strain et al. | |
| 2012/0294517 A1* | 11/2012 | Lings | G06F 18/22 382/162 |
| 2013/0050238 A1 | 2/2013 | Bergou et al. | |
| 2015/0324392 A1 | 11/2015 | Becker et al. | |
| 2016/0155025 A1 | 6/2016 | Arora et al. | |
| 2018/0260974 A1 | 9/2018 | Cameron et al. | |

FOREIGN PATENT DOCUMENTS

| | | |
|---|---|---|
| EP | 2526683 B1 | 1/2016 |
| TW | 201944354 | 11/2019 |
| WO | WO2014/070168 A1 | 5/2014 |
| WO | 2019218078 | 11/2019 |

OTHER PUBLICATIONS

English Translation of CN106202352A.

Q. Zhang, et al., Palette-Based Image Recoloring Using Color Decomposition Optimization, IEEE, Transactions on Image Processing, vol. 26, No. 4, Apr. 2017, pp. 1952-1964.

J. Qi et al., K*-Means: An Effective and Efficient K-Means Clustering Algorithm, IEEE International Conferences on Big Data and Cloud Computing (BDCloud), 2016, pp. 242-249.

G. Ciocca et al., Evaluation of Automatic Image Color Theme Extraction Methods, Department of Informatics, Systems and Communication, CCIW, 2019, p. 165-179.

S.K. Bhatia, Adaptive K-Means Clustering, Department of Mathematics &. Computer Science, American Association for Artificial Intelligence, 2004.

Q. Pan et al., Comparative Evaluation of Color Differences Between Color Palettes, School of Design, Univ. of Leeds, Society for Imaging Science and Tech., 2018, pp. 110-115.

S. Ray et al., Determination of Number of Clusters in K-Means Clustering and Application . . . , School of Computer Scienced and Software Engineering, Aug. 2000.

Z. Gu et al., A Color Schemer for Webpage Design Using Inerative Mood Board, Shanghai Jiao Tong University, Springer-Verlag Berlin Heidelberg, 2013, pp. 555-564.

Search Report of Corresponding Application No. EP 20169805.7, dated Oct. 5, 2020.

Search Report and Written Opinion of Corresponding International Application No. PCT/EP2021/059493, mailed Jun. 30, 2021.

International Preliminary Report on Patentability of Corresponding International Application No. PCT/EP2021/059493, dated Mar. 15, 2022.

Kasimov, D. R., et al. "Approximation of color images based on the clusterization of the color palette and smoothing boundaries by splines and arcs," Kalashnikov Izhevsk State Technical University, Izhevsk, Programming and Computer Software, Springer-Verlag GmbH; ISSN: 0361-7688eISSN: 1608-3261. https://www.elibrary.ru/item.asp?id=35751408; 2018, 44(5): 295-302.

"Examination Report," for Indian Application No. 202217059080, mailed Jun. 2, 2025, 8 pages.

* cited by examiner

METHOD FOR DETERMINING REPRESENTATIVE COLOURS FROM AT LEAST ONE DIGITAL COLOUR IMAGE

CROSS-REFERENCE TO RELATED APPLICATIONS

This application is a 35 U.S.C. § 371 national phase application of PCT Application No. PCT/EP2021/059493 (WO 2021/209413 A1), filed on Apr. 13, 2021, which claims priority to EP Application Serial No. 20169805.7, filed on Apr. 16, 2020, each of which is incorporated herein by reference in its entirety.

FIELD OF THE INVENTION

The invention relates to a method for determining one or more representative colours from at least one digital colour image. In particular, the invention relates to determining one or more paint colours representative of at least one digital colour image. More in particular, the invention relates to the generation of a personalised colour palette from a mood board.

BACKGROUND OF THE INVENTION

Consumers who wish to select one or more paint colours, for example for decorating a room, are presented with a very large number of colour options to choose from. Moreover, selecting multiple paint colours that coordinate with each other, or a paint colour that coordinates with a colour of a piece of furniture for example, is highly subjective and can be a daunting task. Paint manufactures often provide pre-arranged colour palettes that may not reflect a consumer's preferences. The invention therefore aims to facilitate the selection process by providing a consumer with a personalised colour palette based on one or more colour images that are selected by the consumer.

In interior design, a mood board is a creative first step one can take to help in exploring ideas before getting the project off the ground. The colors of a mood board can represent important information about the envisioned interior designs. Although traditionally mood boards are created from foam board and decorated with various physical objects such as stickers, tape, art, photographs, magazine cutouts and fabrics, a digital equivalent of a mood boards (digital mood board) can include one or more digital images.

The one or more images can make up a "mood board" that reflects personal preferences of the consumer. For instance, the consumer may present several colour images, e.g. of natural scenes or interiors, that are to the consumers liking. Based on the mood board the invention aims to provide the consumer with a colour palette of colours, which represent the colours in the compiled mood board.

Colours that have a strong contrast with respect to their surroundings are well perceived by humans, even if the contrasting colours only occupy a small region of an image. It is therefore particularly desired to identify "underrepresented colours", i.e. visually significant colours with low pixel count (or, in other words, colours that occupy only a small region in an image but nevertheless are well perceived), in the one or more images and include these in the colour palette.

Extracting dominant colours from a digital colour image is generally known and typically involves a clustering routine that groups pixels of similar colour values in a digital colour image together. Each group of pixel colour values, i.e. each cluster, can be expressed through a representative colour of that group, such as a mean or median colour value of the pixels in that group. The representative colours of multiple clusters together can form a colour palette of the input image.

Widely used cluster methods for generating such colour palettes are centroid-based algorithms such as k-means clustering or similar, which partition the pixel colour values of an image into a number of clusters, wherein each pixel colour value is assigned to a nearest cluster centroid such that a distance metric of each cluster is minimised. An example of such use of the k-means clustering algorithm is described in "Evaluation of Automatic Image Color Theme Extraction Methods" by G. Ciocca, P. Napoletano, R. Schettini, Computational Color Imaging Workshop (2019). This method works by first selecting k random colors from the image, denoted initial centroids. Then, for all other pixels in the image, the closest initial centroid is determined and the pixel is assigned to that centroid, resulting in groups of pixels (clusters) that are all assigned to its closest centroid. Next, the centroids are recalibrated by calculating the average of all pixels in each cluster. This process is repeated until convergence, i.e., until all new centroids are not significantly different from the old centroids anymore. Although earlier results by Ciocca et al. (2019) demonstrate that the k-means method is quite accurate in extracting appropriate color palettes when compared to other more complex methods, its dependency on the random selection of the initial centroids makes the method not repeatable, limiting its use in practice since running the same method on the same input image multiple times will result in different color palettes. To overcome this issue, Ciocca et al. (2019) proposed a method to fix the initialization by sampling the initial centroids uniformly over a set of colors ordered from the brightest to darkest. Unfortunately, this did not result in better performance. Since the initial centroids are in that case all shades of grey, the colors of the final palette will be biased towards neutral.

A downside of the known colour clustering routines is that they are designed to identify the most prevalent colours in a digital colour image and fail to extract underrepresented colours as defined above.

WO 2014/070168 A1 for example describes the use of a k-means clustering routine for generating a colour palette from an image, wherein the routine involves a pseudo-random seeding of multiple cluster centroids. A downside of such random or pseudo-random initialization is that the outputted colour palette greatly depends on the initial seed of the centroids. In particular, relatively less represented colours, e.g. small sized isolated clusters, in the input image may not be identified as such by the clustering routine and may not end up in the generated colour palette. Moreover, for a given input image, the outputted colour palette is poorly reproducible due to the randomised initialisation of the algorithm.

EP 2526683 A1 also describes the use of a k-means type clustering algorithm for determining the major colours that are present in a sample image, wherein the number of clusters is adaptively increased. The clustering algorithm is initiated by assigning all pixels in the image to a single cluster having a single cluster centroid, here the mean of all pixel values. In each iteration another cluster is added in case the number of pixels that are within a predetermined range of a centroid is below a predetermined threshold. Although this algorithm is not randomly initialised, it is designed to identify the major colours in an image and is not suited for identifying relatively less represented colours, e.g.

small sized isolated clusters. These less represented colours are thus not likely to end up in the outputted colour palette.

EP 1274228 A2 describes a method for generating a reduced set of colours from a digital colour image, for presenting that image on a reduced bit-depth colour output device, such as an LCD screen. The described method boosts important underrepresented colours in the image, specifically skin tone colours, such that they end up in an outputted colour palette. Although underrepresented colours are taken in account in this method, it is for many applications unknown a priori what the underrepresented colours are.

SUMMARY OF THE INVENTION

It is an aim of the invention to provide a method for determining one or more representative colours from one or more digital colour images, wherein less prevalent colours in the one or more colour images are likely to be identified as a representative colour. It is further an aim to provide a method for determining one or more representative colours from one or more digital colour images, which gives reproducible results.

Accordingly, in a first aspect is provided a computer implemented method for determining a predetermined number, k, of representative colours from at least one digital colour image, comprising the steps of:
 a) obtaining at least one digital colour image having a number, p, of pixels each pixel having a colour value within an n-dimensional colour space;
 b) defining a predetermined number of K cluster centres, which are distributed in the colour space in a predetermined pattern, preferably representing different chromatic colours, wherein K>k;
 c) forming clusters by associating for each pixel its colour value with the nearest of the cluster centres;
 d) reducing the number of clusters to k by deleting cluster centres and/or merging clusters;
 e) from each of the resulting k clusters defining a respective representative colour.

The deleting includes determining for each cluster the number of pixels associated with that cluster and deleting the cluster centres in case the number of associated pixels is below or equal to a predefined pruning threshold. The merging includes determining a distance between at least two cluster centres and merging those clusters which have a distance that is smaller than a predefined merging threshold (e.g. which can then be represented by a new cluster centre).

The resulting representative colours may collectively form a colour palette of representative colours of the at least one digital colour image. As the method is initialised by a predefined number K of cluster centres, which exceeds the number k of resultant representative colours, it is likely that a cluster centre will be seeded in the colour space near pixel colour values of an underrepresented colour. As such, this underrepresented colour is likely to be identified by the method and could thus end up in the resulting set of representative colours. For example, an initial cluster centre may be seeded in the colour space near a relatively small and isolated group of pixel values, which pixel values will be associated with that nearest cluster centre to form a cluster. A small isolated group of pixel values typically relates to an underrepresented colour in the at least one digital colour image, and due to its isolation, it may be contrasting with more prevalent or dominant colours in the image. The cluster centre may not be deleted or merged with other cluster centres as it is isolated and has e.g. more associated pixels than the pruning threshold. Such cluster can thus be identified and represented by a representative colour even though it expresses a relatively underrepresented colour in the at least one digital colour image.

Since the K initial cluster centres are predefined and distributed in the colour space in a predetermined pattern, the initialisation in step b) is non-random and the method gives reproducible results for a given digital colour image. In other words, repeatedly performing the method on the same digital colour image results in the same set of resultant representative colours. It will be appreciated that the pattern in which the initial cluster centres are distributed in the colour space is determined independently of the particular digital colour image, i.e. predetermined. Otherwise stated, the predetermined initial seeding pattern is irrespective of the particular digital colour image. It will be appreciated that it is possible to use different patterns for different classes of images.

The resulting set of representative colours can constitute a colour palette for selecting paint colours for decorating, e.g. a room. However, it is clear that the method can be used in various other image processing applications, such as for computer vision, automatic feature detection, file compression etc.

The predetermined number of K initial cluster centres are distributed in the colour space in a predetermined pattern. The predetermined pattern includes initial cluster centres representing different chromatic colours, and optionally achromatic colours. Preferably the predetermined pattern includes initial cluster centres representing different chromatic colours, and optionally achromatic colours, and different brightness values. In an RGB colour space, brightness can be thought of as the arithmetic mean of the red, green, and blue colour coordinates (although some of the three components can make the light seem brighter than others to human perception). The predetermined pattern can include initial cluster centres representing one or more of blues, cyans, greens, yellows, reds and magentas, and preferably all thereof.

In some embodiments, it can be preferred that the K initial cluster centres are spread out in the colour space, such that the initial cluster centres cover as much of the colour space as possible. The cluster centres are preferably evenly spread out (in a regular way) in the colour space, i.e. within the same distance from each other. In other words, the initial cluster centres are preferably uniformly distributed over the n-dimensional colour space. In this way, it becomes more likely that the method identifies underrepresented colours, i.e. small scale and/or isolated clusters, in the at least one digital colour image.

In some embodiments, the K initial cluster centres are preferably distributed in one or more planes in the colour space.

Optionally, the K initial cluster centres are distributed along a straight line in the colour space, e.g. extending across the colour space. Initial cluster centres can be distributed along the achromatic line in the RGB-space extending from black to white. The achromatic line extends between two opposite diagonals in the cubically shaped RGB-space. The K initial cluster centres may be regularly distributed along the line (i.e. within the same distance between the nearest cluster centres). The K initial clusters may be at predefined positions along the line.

In some embodiments, it can be preferred that, the K initial cluster centres are distributed along a plurality of, e.g. straight, lines in the colour space, e.g. each extending across the colour space. The lines may form a grid in the colour space, such that the K initial cluster centres are (regularly)

dispersed across the colour space. The lines can extend between opposite diagonals, opposite ribs and/or opposite planes in the cubic RGB-space. Optionally, the K initial cluster centres are at predefined positions along a plurality of straight lines in the colour space, e.g. each extending across the colour space.

Preferably, the K initial cluster centres are distributed along a plurality of intersecting lines in the colour space, wherein optionally an intersection point of the lines is centrally located in the colour space. The plurality of intersecting lines can extend in the cubic RGB colour space, wherein optionally an intersection point of the lines is centrally located in the cubic RGB colour space. With this star-shaped initialisation the K initial cluster centres are well (evenly) dispersed in the colour space and efficiently span colour space as observed by human eyes. Optionally, the K initial cluster centres are at predefined (regular) positions along a plurality of intersecting lines in the colour space, wherein optionally an intersection point of the lines is centrally located in the colour space.

Thus, instead of uniformly sampling K initial cluster centres on a line running from bright to dark, i.e. achromatic colours, K initial cluster centres can be selected along multiple chromatic directions, such as all major chromatic directions, to cover a wide range of chromaticities. However, when extending the sampling of initial cluster centres from one direction (bright to dark) to multiple directions (e.g. all major chromatic directions) initial cluster centres can be introduced without any associated pixels ("empty clusters"). In view thereof, and in order to increase colour selectivity, the number of initial cluster centres is chosen to be larger than the predetermined number of representative colours to be obtained.

In addition to sampling points in a plurality of chromatic directions, the present method also differs from the k-means algorithm in the following two aspects. Instead of initializing the algorithm with exactly k points, the present method can be initialized with any number K of points, e.g., points that are uniformly sampled in all major chromatic directions. Additionally, the method includes a step in which the colour difference between the cluster centres is calculated and clusters are merged if their colour difference is smaller than the merging threshold. Also, (almost) empty clusters are deleted if the number of pixels in the cluster is below or equal to the pruning threshold. This means that applying the present method will not result in a predefined number of clusters, but the exact number of colours in the final palette will be dependent on the input image. An iterative variant of the method can be provided, allowing to calculate colour palettes with a pre-defined number of colours, which operates by iteratively adapting the merging threshold and/or pruning threshold until a colour palette is obtained with the desired number of colours.

The pruning threshold can for example be set to zero pixels, such that cluster centres of empty clusters, i.e. cluster that have no pixels therein, are deleted.

The term "distance" used herein refers to a similarity or dissimilarity between elements in the colour space. It will be appreciated that any distance metric can be used within the scope of this method to determine a similarity or distance between elements in the colour space, e.g. 1-norm, 2-norm, 3-norm, ∞-norm, etc. For instance, a distance between two colour values in the colour space can be expressed as a Euclidean distance i.e. a 2-norm distance. In this regard, the "nearest" cluster centre to a particular colour value of a pixel is that particular cluster centre for which the distance metric between that colour value and any cluster centre is minimised.

Also in this regard, a distance between clusters refers to a similarity or dissimilarity between clusters. For example, a distance between two clusters may be defined as a distance between their respective cluster centres, or between their respective cluster boundaries.

Clusters are merged by e.g. removing one or more cluster centres from a group of clusters that are similar to each other. For example, two similar clusters can be merged into a single cluster by deleting either one of the cluster centres, for instance the cluster centre which has the smallest or largest number of pixels associated therewith. Optionally, the least chromatic cluster centre is deleted, to steer away from substantially achromatic colours (i.e. black, white and grey shades) in the colour space. It has been found that relatively high-chromatic colours in the colour image are particularly noticed by human observers. Hence, the merging of clusters by selecting the cluster centre associated with a relatively high colorimetric value, (e.g. deleting the cluster centre associated with a lowest colorimetric value) directs the method towards such noticeable high-chromatic colour values to resemble human perception. A colorimetric criterion may be used for determining which cluster centre associates with the least chromatic colour value, e.g. by determining for each cluster centre a Euclidian distance with an achromatic colour value such as black, grey or white. The merging may thus include deleting, from a group of similar cluster centres (using the merging threshold), the least chromatic cluster centre. The pixel values that were associated with the deleted cluster centre, can be re-associated with any of the remaining cluster centres. Similar clusters can also be merged by deleting the old cluster centres and defining a new cluster centre that is based on the colour values of the similar clusters and/or old cluster centres. The new cluster centre may for example be set to an average or weighted average of the similar clusters and/or their respective centres. It will be appreciated that any group of clusters, e.g. groups of clusters of two, three, four, or more clusters, may be merged in case the mutual distance between the cluster centres in the group is smaller than the predefined merging threshold. This way, the merging threshold can be used as a control variable for controlling the reduction, or reduction rate, of clusters from K to k.

It will be appreciated that a cluster centre may be defined by a mean, median, medoid, centroid or any other colour value of a cluster.

Optionally, the method includes after step c) performing step c1): for each cluster, re-determining a cluster centre. After the formation of clusters by associating the colour value of each pixel with the nearest (predefined) cluster centre, the location of the cluster centre can be re-determined. The re-determined cluster centre of a cluster can for example be a colour value which minimises a variance within the cluster, such as a mean value of the colour values in that cluster. Other options for re-determining the cluster centres of a cluster include setting the cluster centre to a median, medoid or other value of the colour values in that cluster. The re-determined cluster centre can be a constituent colour value of the cluster, i.e. a member of the cluster's colour values, but this is not necessarily the case. After re-determining the cluster centres it is possible to repeat the step of forming clusters by, for each pixel associating its colour value with the nearest of the cluster centres. Then again, e.g. cluster centres of empty cluster can be deleted in step d), and similar clusters can be merged to obtain k clusters. The representative colours can be based on the re-determined cluster centres.

Optionally, the method includes iterating the steps c), c1), d). Said steps may be iterated a predefined number of times. Optionally, the steps c) c1) and d) are iterated until a convergence criterion is met. Accordingly, after initialisation of step b), the following steps may be iterated:
c) forming clusters by associating for each pixel its colour value with the nearest of the cluster centres;
c1) for each cluster, re-determining a cluster centre;
d) reducing the number of clusters to k by deleting cluster centres and/or merging clusters, wherein the deleting includes
for each cluster, determining the number of pixels associated with that cluster, and
deleting the cluster centres, in case the number of associated pixels is below or equal to a predefined pruning threshold,
and wherein the merging includes:
determining a distance between at least two clusters and/or cluster centres and
merging those clusters which have a distance that is smaller than a predefined merging threshold.

In this way the method converges to a local optimum where k clusters are resultant that each have a cluster centre. Also, the cluster centres converge to colour values in the colour space in a way similar to centroid-based clustering methods such as k-means clustering or similar. After the iteration of steps c), c1) and d), the representative colours can be determined in step e). The ultimately determined cluster centres can for example define the representative colours in step e).

Optionally, the method includes after step d) performing the steps:
d1) determining the number of clusters, and if the determined number of clusters is not equal to k:
d2) adjusting the merging threshold and/or the pruning threshold based on the determined number of clusters.

For example, the merging threshold and the pruning threshold are defined a priori. After obtaining the at least one digital colour image in step a) and initialising the cluster centres in step b), K clusters may be formed in (a first instance of) step c). Cluster centres of the formed clusters may optionally be re-determined in the step c1) but this step may be omitted. The K clusters are subsequently reduced in number in step d) by deleting cluster centres and/or merging clusters based on the merging and pruning thresholds. In case that after reducing the number of clusters, the resulting number of clusters is not equal to k, the merging threshold and the pruning threshold are adjusted so as to obtain k clusters. It can be preferred to set the pruning threshold to zero, i.e. to delete only cluster centres of empty clusters in step d), and only adjust the merging threshold.

The number of clusters can for instance be determined by counting the number of cluster centres.

It is also possible, after step b), to iterate the steps c), c1) and d), and after several iterations, e.g. until convergence, perform step d1), d2) and e).

Optionally, the step d2) includes:
in case the number of clusters is higher than k: increasing the merging threshold and/or the pruning threshold; and
in case the number of clusters is lower than k: decreasing the merging threshold and/or the pruning threshold.

Optionally, the method including iterating the steps d1), d2), c), optionally c1), d) until the resulting number of clusters is equal to k. For example, the merging threshold and the pruning threshold are defined a priori. After obtaining the at least one digital colour image in step a) and initialising the cluster centres in step b), K clusters may be formed in step c). Cluster centres of the formed clusters may optionally be re-determined in the step c1) but this step may be omitted. The K clusters are subsequently reduced in number in step d) by deleting cluster centres and/or merging clusters based on the merging and pruning thresholds. In case, after reducing the number of clusters, the resulting number of clusters is not equal to k, the merging threshold and the pruning threshold are adjusted. For example, the merging threshold and/or the pruning threshold can be increased if the number of clusters is higher than k. In case the number of clusters is lower than k, the merging threshold and/or the pruning threshold can be decreased. The merging threshold and/or the pruning threshold can for instance be adjusted linearly, i.e. by fixed increments, or non-linearly, i.e. by ascending or descending increments. It is preferred to set the pruning threshold to zero and not to adjust the pruning threshold in step d2). In this way, only the cluster centres of empty clusters are deleted in step d). After adjusting the merging and/or pruning thresholds. The method can be re-executed based on the adjusted merging and/or pruning thresholds. Accordingly, steps d1), d2), c), optionally c1, and d) can be iterated several times until e.g. the number of clusters are reduced from K to k in step d). From the resultant k clusters, k representative colours can be determined in step e). The k representative colours are for example the ultimate cluster centres or mean values of the respective clusters.

It is also possible, after step b), to iterate the steps c), c1) and d), and after several iterations, e.g. until convergence, perform step d1) and d2). If, after several iterations the number of clusters is not equal to k, the merging threshold and/or pruning threshold can be adjusted in steps d1) and d2). This procedure can be repeated several times, i.e. after the adjustment in step d2), the method can again include iterating steps c), c1) d), until the number of clusters are reduced from K to k. The resultant k clusters can then be used to determine the k representative colours in step e). For example, the respective cluster centres of the k clusters can define the representative colours.

Optionally, the representative colours are representative constituent colours of the at least one digital colour image. For some applications it is preferred to determine representative colours in a digital colour image that are a member of the p pixel values of the colour image. In that case, a representative colour can for instance be determined in step e) by selecting the cluster median or medoid. A constituent colour value nearest to a mean of its cluster can also be selected as the representative colour for that cluster.

Optionally the n-dimensional colour space is an RGB-space. Typical digital colour images are represented by a red, green, and blue channel. For example, each channel of a 24-bit digital image has 8-bits. The RGB-space can thus be defined as a three-dimensional vector space, wherein the three axes of the RGB-space define red, green and blue colour values. The RGB-space would for instance be 256×256×256 colour values. It will be appreciated that the colour space can also be another colour space such as a CMYK-space, CIELAB-space or CIEXYZ space.

Optionally, the representative colours are compared with a set of standard paint colours. Those paint colours from the set of standard paint colours may be selected, which are most similar to the representative colours.

Optionally, paint can be prepared of any one of the representative colours. This can for instance be performed using a paint mixing device. The paint mixing device can take one or more of the representative colours, i.e. a colour palette, as an input, and mix toners to obtain the desired colour(s). The paint mixing machine may also take one or more digital colour images as an input, such as a mood board, wherein a, e.g. dedicated, processing unit of the paint mixing machine performs a method as described herein. A user could select one of the representative colours, upon which the paint mixing device mixes paint toners together to obtain a paint having the selected colour.

According to a second aspect, there is provided a computer implemented method for determining paint colours, comprising determining a predetermined number of k representative colours from at least one digital colour image by performing a method of the first aspect, and further comprising comparing each of the k representative colours with standard paint colours in a standard paint colour library, and assigning to each of the representative colours a respective matching standard paint colour of the standard paint colour library.

According to a third aspect, a system is provided for determining a predetermined number of k representative colours from at least one digital colour image, the system comprising:
- a receiver for receiving at least one digital colour image having p pixels each pixel having a colour value within an n-dimensional colour space;
- an initialiser for initialising a, e.g. predetermined, number of K, e.g. predefined, cluster centres which are distributed in the colour space, e.g. in a predetermined pattern, wherein K>k;
- an allocator for forming clusters by associating the colour value of each pixel with its nearest seed centre;
- a reduction unit for reducing the number of clusters to k, wherein the reduction unit includes a pruning unit for deleting cluster centres and/or a merging unit for merging clusters,
- wherein the pruning unit is arranged for deleting the cluster centres which have a number of associated pixels that is below or equal to a predefined pruning threshold, and wherein the merging unit is arranged for merging those clusters which have a distance that is smaller than a predefined merging threshold;
- a definer for defining for each of the resulting k clusters a respective representative colour.

The system may be arranged to perform the method of the first aspect.

Optionally, the system comprises a database including one or more standard paint colours, and a comparator for comparing each of the k representative colours with the one or more standard paint colours.

Optionally, the system comprises a user-interface arranged for receiving one or more digital colour images from a user and outputting a colour palette of the k representative colours.

Optionally, the system comprises a compiler for compiling one or more digital colour images into a single mood board image.

It will be appreciated that all features and options mentioned in view of the method apply equally to the systems and computer program product, and vice versa. It will also be clear that any one or more of the above aspects, features and options can be combined.

The method as described herein can be executed on a computing device such as a point-of-sale computer system or a mobile computing system, e.g. a smart phone, tablet, laptop computer or the like. The method can also be provided by a computer program product, such as an app or web-based software, loaded and executed on a general-purpose computer or mobile computing system.

BRIEF DESCRIPTION OF THE DRAWINGS

Embodiments of the present invention will now be described in detail with reference to the accompanying drawings in which.

DETAILED DESCRIPTION OF THE INVENTION

Determining a set of representative colours from a digital colour image can be useful for many applications. For example, for facilitating paint colour selection the methods described herein can provide a colour palette with representative colours based on one or more digital colour images that are provided by a user. The user can for instance collect and input a set of one or more digital colour images of his liking and is provided with a colour palette based on the colours in the inputted images. The several colour images can be inputted individually or constitute a single mood board image or collage. Each image in the set of images may be weighted differently to express certain preferences in the set of images. For instance, certain images of the images that constitute the mood board can be enlarged to amplify a weight of the colours in that particular image.

Since colours with a strong contrast with respect to their surroundings stand out to the human observer, even if a colour occupies only a small region of the mood board, it is desired to take these underrepresented colours into account and to ensure that these colours are identified as a representative colour. For instance, a mood board can be made up of several images of interior designs where dark shades of blue and grey are most prevalent. In some of the images that make up the mood board, however, there may be small bright yellow features depicted, which stand out in the predominantly dark blue and grey environment. Overall, this bright yellow colour only covers a minor portion of the mood board, i.e. only few pixels are yellow, but its presence is clearly perceivable by the user, and may be in the mood board for that reason. To enable the identification of such minor colour, a computer implemented method for determining a predetermined number of k representative colours from at least one digital colour image is provided as shown schematically in FIG. 1.

The number k of representative colours may be defined a priori to any desired number.

Figure 1:
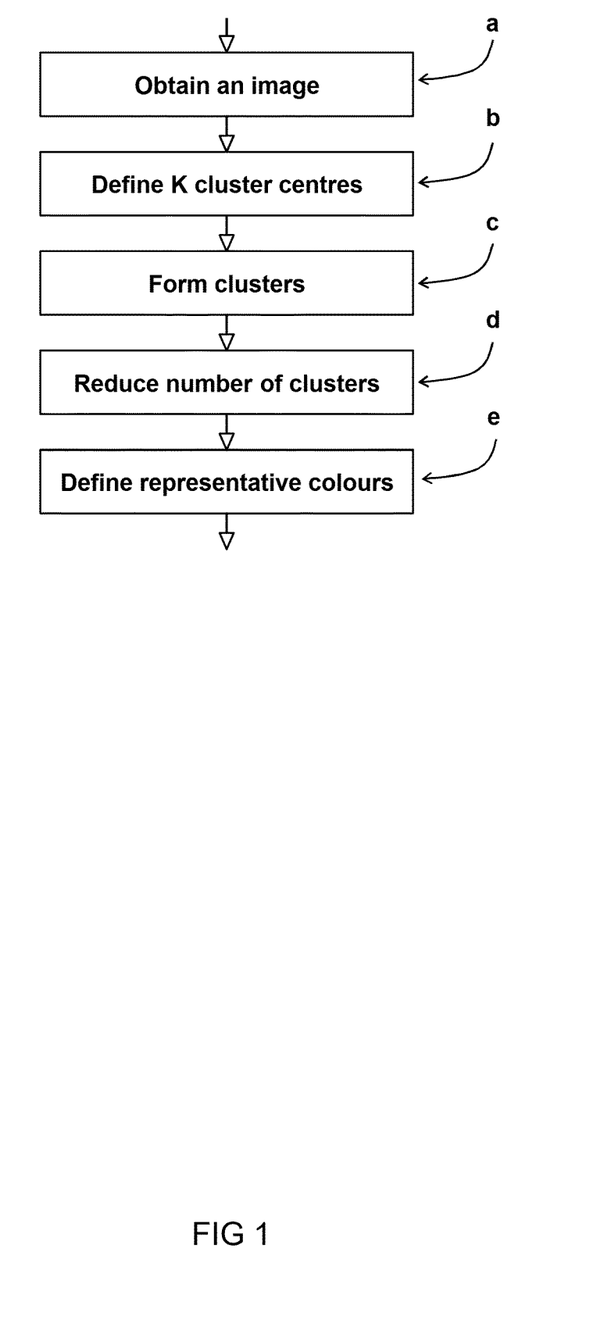
FIGS. 1-7 each show a schematic flow chart of a method.

FIG. 1 shows a schematic flow chart of a method, wherein step a) includes:
- a) obtaining at least one digital colour image having a number, p, of pixels each pixel having a colour value within an n-dimensional colour space.

This at least one digital colour image may be a single image or a set of images. The single image can for example be a composition of multiple colour images, e.g. constituting a mood board that reflects a personal preference of a user. Typically, digital colour images are represented by a red, green, and blue channel, wherein each pixel has red, green and blue colour value assigned to it. In a 24-bit digital image each channel has 8-bits, such that each pixel can have 256 different red, 256 different green and 256 different blue colour values, for example on a scale from 0 to 255. The n-dimensional colour space can thus be a three-dimensional RGB-space, wherein the three axes of the RGB-space define red, green and blue colour values. The colour value of each pixel can be represented with a vector in the 256×256×256 RGB-vector space. It will be appreciated that the colour space can also be another colour space such as a CMYK-space, CIELAB-space or CIEXYZ space.

A subsequent step of the method is step:
b) defining a predetermined number of K cluster centres, which are distributed in the colour space in a predetermined pattern, wherein K>k.

Figure 8A:
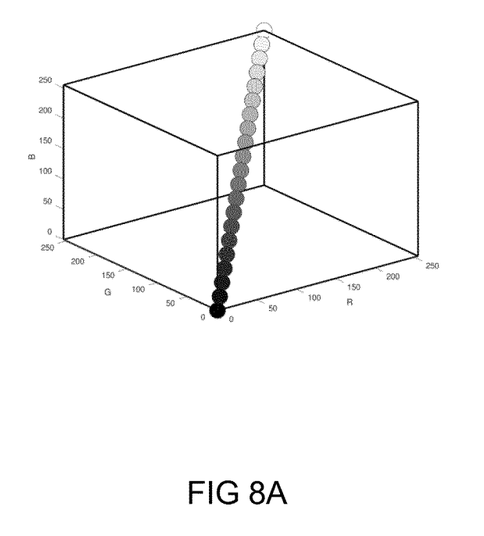
FIGS. 8A and 8B show a schematic example of a predetermined number of K predefined cluster centres which are distributed in the colour space in a predetermined pattern.
Figure 8B:
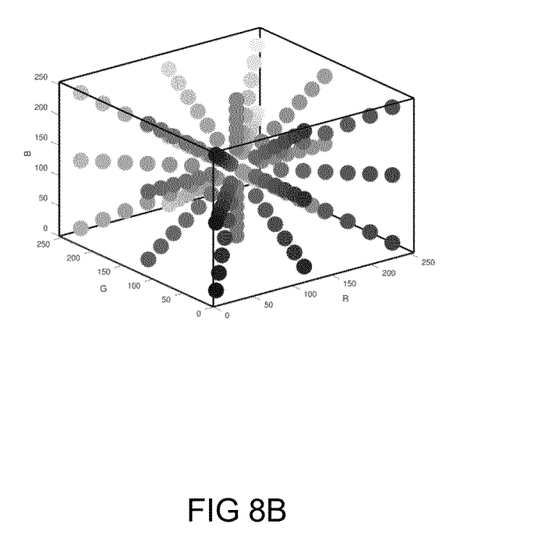

The number K of initial cluster centres may be dispersed in the colour space. FIGS. 8A and 8B show two alternative patterns of how the K initial clusters can be seeded in the colour space. FIG. 8A shows a particular distribution of K predefined cluster centres, here 21 cluster centres, that are distributed along an achromatic line in the RGB colour space, diagonally across the RGB space between two opposing corners.

FIG. 8B shows a particular distribution of K predefined cluster centres, that are distributed along multiple straight lines, e.g. 13, in the RGB colour space, e.g. extending between opposing corners, rib midpoints, and centres of planes of the RGB space. The lines intersect at a central point in the RGB space and create a star-like configuration of predefined cluster centres. In this configuration, the colour space is densely seeded with predefined cluster centres, which span the entire colour space. The number of K predefined clusters thereby exceeds the number of k representative colours.

After initialising in step b) the method includes performing:
c) forming clusters by, for each pixel associating its colour value with the nearest of the cluster centres. The nearest cluster centre from a pixel may be based on a Euclidean distance or any other distance metric. A cluster is defined by the set of pixel colour values that are associated with a single cluster centre. Some clusters may be empty when a cluster centre has no pixel colour values associated therewith.

A next method step includes:
d) reducing the number of clusters to k by deleting cluster centres and/or merging clusters, wherein the deleting includes:
for each cluster, determining the number of pixels associated with that cluster, and
deleting the cluster centres in case the number of associated pixels is below or equal to a predefined pruning threshold,
and wherein the merging includes:
determining a distance between at least two clusters and
merging those clusters which have a distance that is smaller than a predefined merging threshold.

To obtain a predetermined number k of representative colours, it is desired to reduce the number of clusters and cluster centres from K to k. This is done by merging of clusters and/or deleting cluster centres. It can be preferred to set the pruning threshold to zero, so that only cluster centres of empty clusters that have no pixels in the cluster are deleted. In some embodiments, when cluster centres of non-empty clusters are removed, the pixels that have been previously assigned to this cluster can be marked as unallocated or allocated to a cluster with the closest cluster centre. If they are marked as unallocated, then in the next iteration it is possible to assign them to a different new cluster. Clusters with the centres that are close to each other can be merged, as these clusters are likely to represent similar colours. The similarity between clusters can be defined by a distance between their respective cluster centres. The merging threshold can be defined as a distance, wherein two clusters are merged in case that a distance between them is less than this threshold distance. The merging and/or pruning threshold may be adjusted such that the number of clusters are reduced from K to k.

After reduction of the number of clusters in step d), a final step in the method includes:
e) from each of the resulting k clusters defining a respective representative colour.

The representative colours may for example be the respective mean colour values of the clusters. The representative colour may also be a constituent colour, i.e. a colour value that is a member of the p pixels in the original digital colour image. In that case, a pixel colour value may be selected that is closest to the mean colour value of a cluster, or alternatively, a median or medoid value of a cluster can define the representative colour of the cluster.

Figure 2:
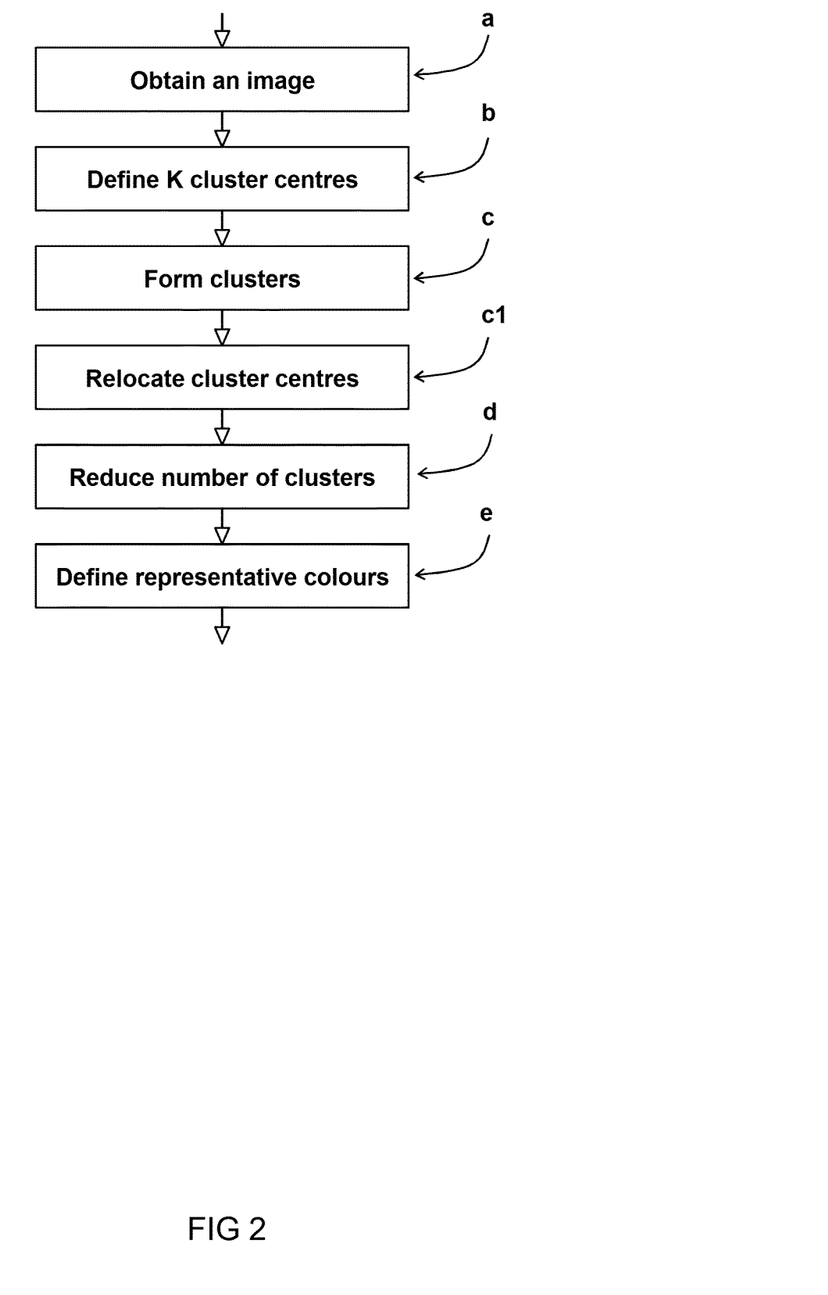

FIG. 2 shows a schematic flow chart of a method, wherein after step c), step c1) is performed, step c1 including:
c1) for each cluster, re-determining a cluster centre. The re-determined cluster centre of a cluster can for example be a colour value which minimises a variance within the cluster, such as a mean value of the colour values in that cluster. Other options for re-determining the cluster centres of a cluster include setting the cluster centre to a median, medoid or other value of the colour values in that cluster. The re-determined cluster centre can be a constituent colour value of the cluster, i.e. a member of the cluster's colour values, but this is not necessarily the case.

Figure 3:
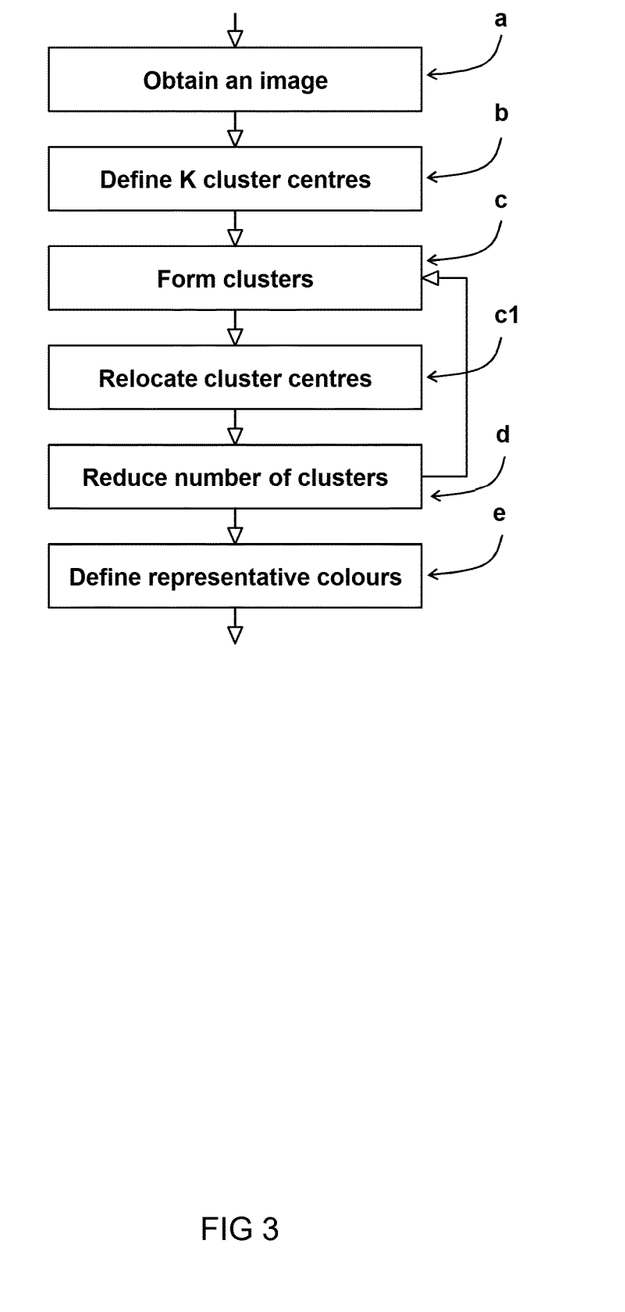

FIG. 3 shows a schematic flow chart of a method, wherein steps c), c1) and d) are iterated. Accordingly, after step d) has been completed, the method continues with step c) instead of step e). After a certain convergence criterion is met, the method continues with step e) after step d). The convergence criterion may be predefined number of iterations and/or a convergence metric. Iterating steps c) and c1) resembles steps taken in commonly known clustering techniques, such as k-means clustering and similar, in which the cluster centres converge to a local optimum. Including step d) in the iteration provides a convergence of the number of cluster centres from K predefined clusters to k clusters. The clusters are iteratively reduced from K to k by the relocation of the cluster centres in step c1). Cluster centres may relocate from their predefined positions (step b)) such that a distance between some cluster centres becomes smaller every iteration. Some cluster centres for example converge to the same local optimum, and at some point, define smaller distance between them than the predefined merging threshold. Those clusters are merged in step d), until k clusters result. It may be possible that the method does not converge to k clusters. In such case the pruning threshold and/or merging threshold may need to be set to a different value, e.g. manually.

Figure 4:
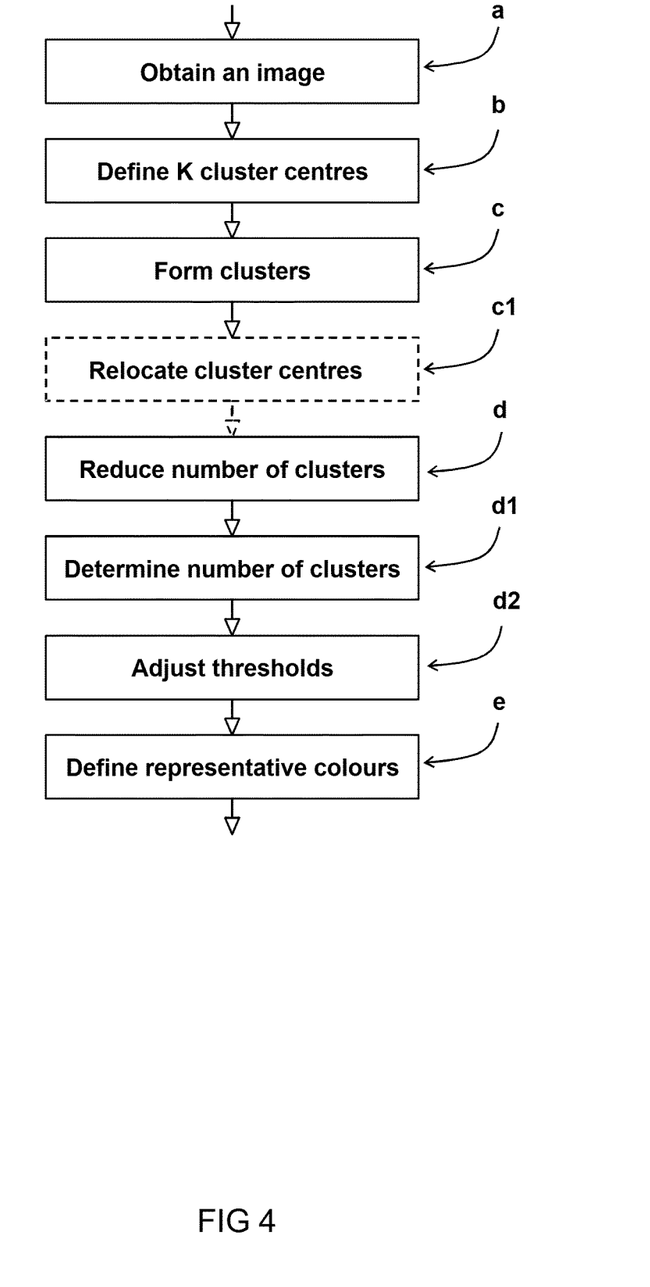

FIG. 4 shows a schematic flow chart of a method, wherein after step d) of reducing the number of clusters, steps d1) and d2) are performed, wherein:
d1) determining the number of clusters, and if the determined number of clusters is not equal to k:
d2) adjusting the merging threshold and/or the pruning threshold based on the determined number of clusters. Step c1) is optional in the method of FIG. 4 as is indicated by the dashed lines.

The number of clusters may be determined based on the number of cluster centres. For example, the number of clusters can be determined by determining the number of cluster centres, wherein, if the determined number of cluster centres is not equal to k, step d2) is performed.

In particular, the merging threshold and/or the pruning threshold can be increased in case the number of clusters and/or cluster centres is higher than k. Similarly, in case the number of clusters is lower than k, the merging threshold and/or the pruning threshold can be decreased. It can be preferred to set the pruning threshold to zero, such that only cluster centres of empty clusters are deleted, and not to adjust the pruning threshold. This ensures that even very small clusters, i.e. highly underrepresented colours, are identified by the method.

Figure 5:
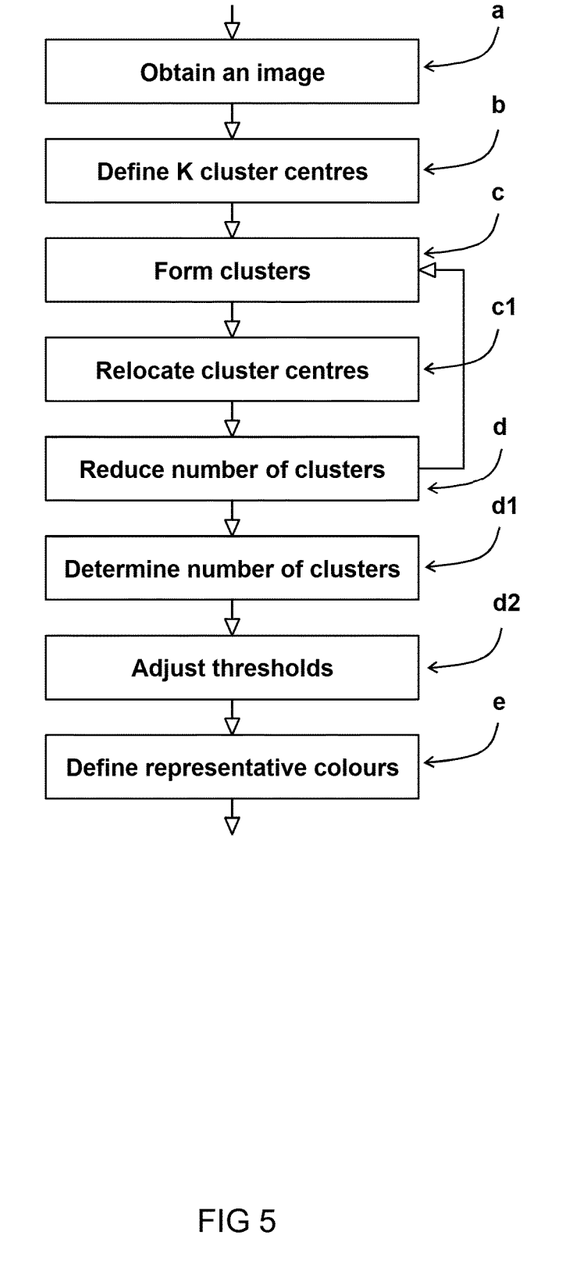

FIG. 5 shows a schematic flow chart of a method, wherein steps c), c1) and d) are iterated. As explained with regard to the method shown in FIG. 3, the iteration of steps c), c1) and d) allows for convergence of the cluster centres to a local optimum, similar to steps taken in centroid based clustering algorithms, wherein step d) enables an (iterative) reduction of the number of clusters to k.

Figure 6:
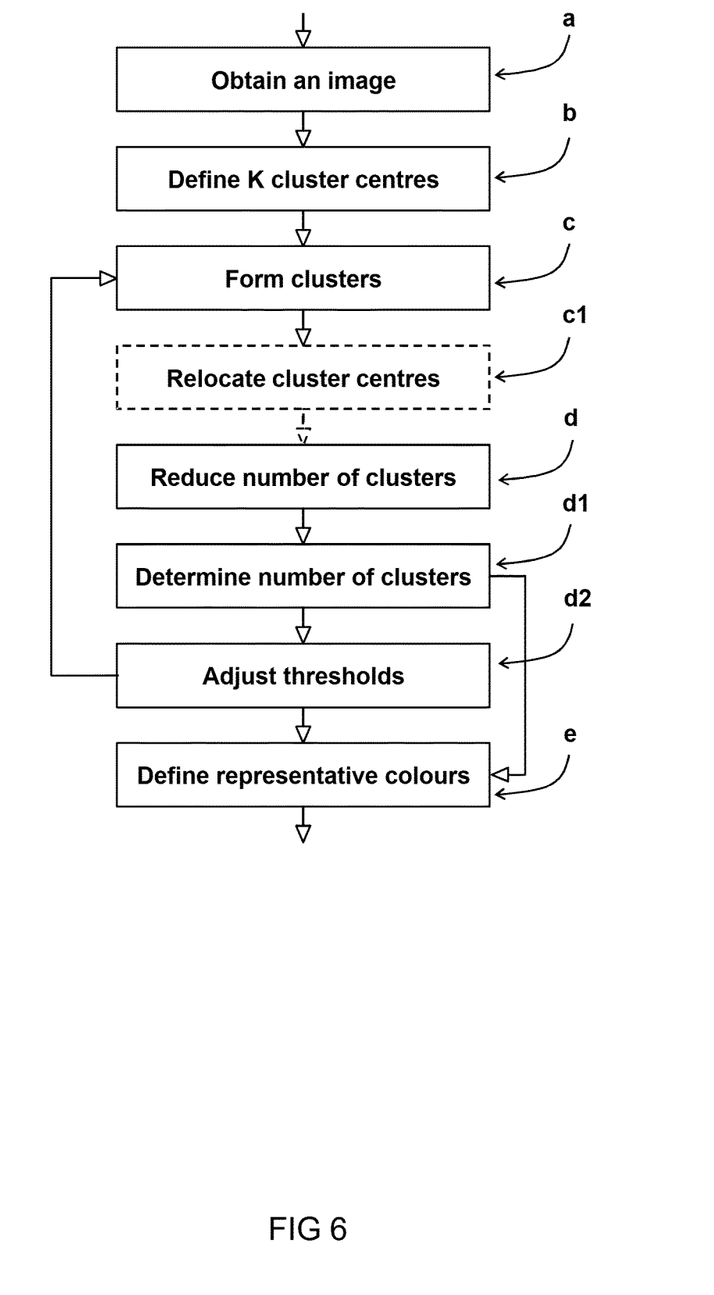

FIG. 6 shows a schematic flow chart of a method, wherein steps c), d), d1), d2) are iterated, or steps c), c1), d), d1), d2) are iterated. In other words, step c1), i.e. for each cluster, re-determining a cluster centre, is optional as indicated by the dashed lines. The merging threshold and/or the pruning threshold can be adjusted in steps d1) and d2), based on the number clusters after the reduction step d). For example, after initialising the initial cluster centres in step b), clusters are formed in step c), which are reduced in number in step d) based on a setting of the merging and pruning thresholds. In case the number of clusters after reduction is not equal to k, steps d1) and d2) enable adjustment of the merging and/or pruning threshold such that the method can be partially re-executed, starting from step c), based on the adjusted thresholds. For instance, the merging threshold and/or the pruning threshold can be increased every iteration in case the number of clusters is higher than k. Similarly, in case the number of clusters is lower than k, the merging threshold and/or the pruning threshold can be decreased. The thresholds can be adjusted incrementally every iteration such that the number of clusters converges from K to k. Relocating cluster centres of step c1) is not essential in this method and can be omitted to decrease the computational cost. In case the number of clusters after reduction in step d) is equal to k, the method breaks the loop and continues with step e).

Figure 7:
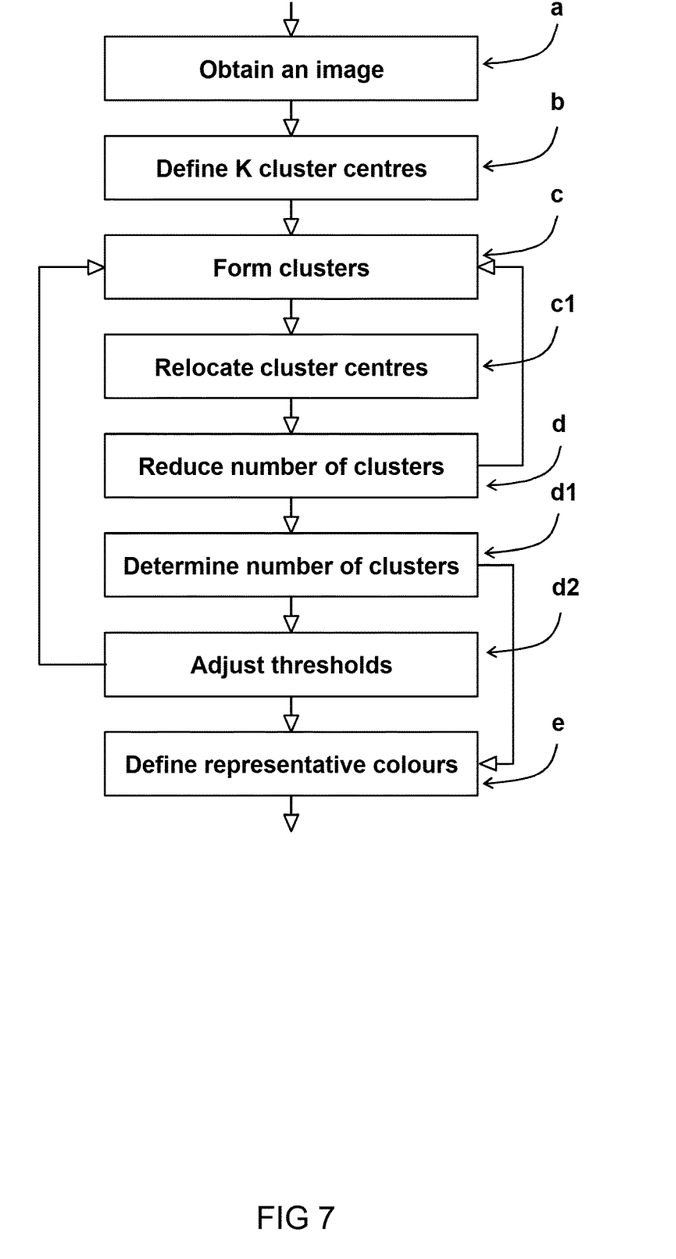

FIG. 7 shows a schematic flow chart of a method, wherein two iterations occur. Firstly, an inner loop constitutes of iterating steps c), c1) and d) as explained in relation to the methods as shown in FIGS. 3 and 5, and secondly an outer loop as explained in relation to the method as shown in FIG. 6. The method involves, after obtaining the digital colour image in step a) and initialising the predefined cluster centres in step b), iterating the inner loop of steps c), c1) and d), e.g. until convergence. After this iteration of the inner loop, the method continues with steps d1) and d2) in which the merging threshold and/or the pruning threshold is adjusted, in case the number of clusters and/or cluster centres is not equal to k. After the adjustment of the thresholds, the method loops back to step c) which restarts the iteration of the inner loop, e.g. until convergence. In case after step d) the number of clusters is equal to k, the thresholds are not adjusted and the method breaks the outer loop and continues with performing step e).

After having performed the method steps as explained in relation to any of FIGS. 1-7, the user may be presented with the set of representative colours. The representative colours may be standard paint colours or may be compared with standard paint colours in a standard paint colour library and converted to the closest standard paint colours, e.g. by known algorithms. Paints with the representative colours or with the standard paint colours that are close to the representative colours, can then be prepared e.g. in a paint mixing machine. The paint mixing device may for instance have user interface, wherein user can input a representative colour resultant from a method as described herein or a nearest standard colour, wherein the paint mixing device outputs a paint of that particular colour e.g. by mixing paint toners. The paint mixing device may also take one or more digital colour images as an input, such as a mood board, wherein a processing unit of the device executes the method for determining a set of representative colours. The user could, e.g., select with the user interface, one of the colours of his liking, upon which the paint mixing machine prepares a paint of the desired colour.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A computer implemented method for determining a predetermined number, k, of representative colours from at least one digital colour image, comprising the steps of:
   a) obtaining at least one digital colour image having a number, p, of pixels each pixel having a colour value within an n-dimensional colour space;
   b) defining, irrespective of the obtained image, a predetermined number, K, of cluster centres which are distributed along a plurality of lines in cubic RGB colour space intersecting at an intersection point located centrally in the cubic RGB colour space, wherein K>k;
   c) forming clusters by, for each pixel, associating its colour value with the nearest of the cluster centres; and after forming the clusters,
   c1) for each cluster, re-determining a cluster centre;
   d) reducing the number of clusters to k by deleting cluster centres and merging clusters, wherein the deleting includes:
      for each cluster, determining the number of pixels associated with that cluster, and deleting the cluster centres when the number of associated pixels is below or equal to a predefined pruning threshold,
      and wherein the merging includes:
      determining a distance between at least two clusters and merging those clusters which have a distance that is smaller than a predefined merging threshold;
   wherein the steps c), c1), and d) are iterated; and
   after step d) performing the steps:
   d1) determining the number of clusters, and if the determined number of clusters is not equal to k, d2) adjusting the merging threshold and/or the pruning threshold based on the determined number of clusters;

wherein step d2) includes:

if the number of clusters is higher than k, increasing the merging threshold and/or the pruning threshold; and if the number of clusters is lower than k, decreasing the merging threshold and/or the pruning threshold; and e) defining a respective representative colour from each of the resulting k clusters.

2. The method according to claim 1, wherein the predetermined number, K, of cluster centres are distributed along a plurality of straight lines extending between opposite corners, rib midpoints and centres of planes in RGB colour space.

3. The method according to claim 1, including iterating steps d1), d2), c), c1), and d) until the resulting number of clusters is equal to k.

4. The method according to claim 1, wherein the representative colours are representative constituent colours of the at least one digital colour image.

5. The method according to claim 1, wherein the predetermined number, K, of cluster centres are regularly spread out along the lines.

6. The method according to claim 1, wherein the predetermined number, K, of cluster centres are distributed in one or more planes in the colour space.

7. The method according to claim 1, wherein the predetermined number, K, of cluster centres are distributed along one or more straight lines in the colour space.

8. The method according to claim 1, wherein the resulting k defined representative colours constitute a colour palette.

9. A computer implemented method for determining paint colours, comprising determining a predetermined number of k representative colours from at least one digital colour image according to the method of claim 1, and further comprising comparing each of the k representative colours with standard paint colours in a standard paint colour library, and assigning to each of the representative colours a respective matching standard paint colour of the standard paint colour library.

10. A system for determining a predetermined number, k, of representative colours from at least one digital colour image, the system comprising:

a receiver for receiving at least one digital colour image having p pixels, each pixel having a colour value within an n-dimensional colour space;

an initialiser for initialising, irrespective of the received image, a predetermined number, K, of cluster centres which are distributed along a plurality of lines in cubic RGB colour space intersecting at an intersection point located centrally in the cubic RGB colour space, wherein K>k;

an allocator for forming clusters by associating the colour value of each pixel with its nearest seed centre, and after forming the clusters, re-determining a cluster centre;

a reduction unit for reducing the number of clusters to k, wherein the reduction unit includes a pruning unit for deleting cluster centres and a merging unit for merging clusters, wherein the pruning unit is arranged for deleting the cluster centres which have a number of associated pixels that is below or equal to a predefined pruning threshold, wherein the merging unit is arranged for merging those clusters which have a distance that is smaller than a predefined merging threshold; wherein the reduction unit is configured to determine the number of clusters and if the determined number of clusters is not equal to k, the reduction unit is configured to adjust the merging threshold and/or pruning threshold based on the determined number of clusters; wherein the reduction unit is configured to increase the merging threshold and/or the pruning threshold if the number of clusters is higher than k, and the reduction unit is configured to decrease the merging threshold and/or the pruning threshold if the number of clusters is lower than k; and a definer for defining for each of the resulting k clusters a respective representative colour.

* * * * *